US012151919B2

(12) United States Patent
Chen

(10) Patent No.: US 12,151,919 B2
(45) Date of Patent: Nov. 26, 2024

(54) WINCH CLUTCH AND WINCH THEREOF

(71) Applicant: NINGBO FUYOU OUTDOOR PRODUCTS CO., LTD., Zhejiang (CN)

(72) Inventor: Maojie Chen, Zhejiang (CN)

(73) Assignee: NINGBO FUYOU OUTDOOR PRODUCTS CO., LTD., Zhejiang (CN)

( * ) Notice: Subject to any disclaimer, the term of this patent is extended or adjusted under 35 U.S.C. 154(b) by 0 days.

(21) Appl. No.: 18/362,984

(22) Filed: Aug. 1, 2023

(65) Prior Publication Data

US 2024/0174496 A1 May 30, 2024

(30) Foreign Application Priority Data

Nov. 28, 2022 (CN) ........................ 202223170519.3

(51) Int. Cl.
*F16H 3/04* (2006.01)
*B66D 1/14* (2006.01)
*B66D 1/28* (2006.01)

(52) U.S. Cl.
CPC *B66D 1/14* (2013.01); *B66D 1/28* (2013.01)

(58) Field of Classification Search
CPC ................ F16H 3/04; B66D 1/14; B66D 1/28
USPC .................................................... 74/324, 325
See application file for complete search history.

(56) References Cited

U.S. PATENT DOCUMENTS

| | | | | |
|---|---|---|---|---|
| 4,736,929 | A * | 4/1988 | McMorris | B66D 1/22 254/323 |
| 5,261,646 | A * | 11/1993 | Telford | F16D 59/02 254/362 |
| 6,604,731 | B2 * | 8/2003 | Hodge | B66D 1/22 254/344 |
| 7,703,751 | B2 * | 4/2010 | Elliott | B66D 1/22 254/344 |
| 9,988,249 | B2 * | 6/2018 | Maghsoodi | F16D 13/75 |
| 11,286,138 | B2 * | 3/2022 | Yu | B66D 1/14 |
| 11,673,777 | B2 * | 6/2023 | Elliot | H02K 7/102 188/71.5 |
| 2013/0056694 | A1 * | 3/2013 | Wilkins | B66D 5/00 475/318 |

FOREIGN PATENT DOCUMENTS

| | | |
|---|---|---|
| CN | 208532082 | 2/2019 |
| CN | 208776242 | 4/2019 |
| CN | 111847293 | 2/2022 |
| CN | 215798126 | 2/2022 |

* cited by examiner

*Primary Examiner* — Ha Dinh Ho
(74) *Attorney, Agent, or Firm* — JCIPRNET

(57) ABSTRACT

A winch clutch comprises a first gear ring, a drive motor, a rotary member, a transmission member, a clutching member and an elastic reset member. The clutching member is separably connected to the plurality of clutch portions of the first gear ring to stop the first gear ring. Compared with the prior art, the winch clutch of the present invention uses the drive motor to drive the rotary member to rotate, and achieves connection or separation between the clutching member and the clutch portions on the first gear ring through the transmission member, so as to control the winch to start or stop. Compared with conventional manual clutches, manual operation is not required and operation is convenient in the present invention, completely solving the problem of a failure of a vehicle winch clutch.

10 Claims, 6 Drawing Sheets

WINCH CLUTCH AND WINCH THEREOF

CROSS-REFERENCE TO RELATED APPLICATION

This application claims the priority benefit of China application serial no. 202223170519.3, filed on Nov. 28, 2022. The entirety of the above-mentioned patent application is hereby incorporated by reference herein and made a part of this specification.

BACKGROUND

Technical Field

The present invention relates to the field of balance valves, and in particular to a winch clutch and a winch thereof.

Description of Related Art

A winch, a kind of traction device, can be used to tow vehicles, trees or goods after being mounted on an off-road vehicle or other special vehicles. In general, it is structurally composed of a motor, a controller, a brake, a reducer, a clutch, a drum, a rope and a frame.

In addition, its transmission mechanism adopts a three-stage planetary reducer in most cases, for example, as disclosed in a Chinese Patent CN215798126U (patent NO: ZL202122252004.7). Specifically, the motor drives a transmission shaft to pass through a center through hole to drive a first-stage sun gear to rotate at a tail end of the transmission shaft, a first-stage gear ring keeps fixed, a first-stage planetary gear drives a first-stage gear carrier to rotate, a center of the first-stage gear carrier drives a second-stage sun gear, and the second-stage sun gear drives a second-stage planetary gear to move in a second-stage gear ring. When the second-stage gear ring keeps fixed without rotation, a second-stage gear carrier normally decelerates according to a reduction ratio, and the second-stage gear carrier will drive a third-stage sun gear to rotate. Since a third-stage gear ring is fixed, the third-stage sun gear will drive a third-stage gear carrier to rotate, and the third-stage gear carrier synchronously drives the drum to rotate and finally pulls the rope. When the second-stage gear ring is released and resumes rotation, the second-stage gear carrier will encounter resistance from the third-stage sun gear, and the second-stage gear ring rotates without transmitting power to the drum.

In the prior art, a Chinese Patent CN208532082U (patent NO: ZL201820685426.9), a Chinese Patent CN208776242U (patent NO: ZL201821420997.6) and a Chinese Patent CN111847293B (patent NO: ZL201910746673.4) disclosed a winch generally with a manual clutch. In practice, the winch is mounted to a bottom of a front end of a vehicle head after a bumper of the vehicle is removed, and then the bumper is reset, so that the winch is hidden inside the vehicle head. In this case, the clutch fails and cannot be operated manually, and can merely be controlled with the aid of a control apparatus (such as a remote control).

SUMMARY

It is a first object of the present invention to provide a winch clutch which is convenient to operate.

It is a second object of the present invention to provide a winch with the winch clutch.

To achieve the first object, the winch clutch comprises a gear box having a rotatable first gear ring, a drive motor having an output shaft, a rotary member, a transmission member, a clutching member having a first end and a second end, and an elastic reset member; wherein, the rotary member is connected to the output shaft of the drive motor rotating with the output shaft; the transmission member is movable and has a first portion and a second portion both located on one side of the rotary member and capable of being separated from or resisting against the rotary member during the rotation of the rotary member, the rotary member is capable of driving the movable transmission member to be at least in a first state and a second state; the first gear ring has a plurality of clutch portions, the clutching member is movable and separably connected to the plurality of clutch portions of the first gear ring, so as to stop the first gear ring; the elastic reset member is connected to the clutching member, when the clutching member is separated from the clutch portions of the first gear ring, the elastic reset member make the clutching member keep to be connected to the clutch portions; and, when the transmission member is in the first state, the first portion of the transmission member resists against the rotary member, and the second portion of the transmission member drives the clutching member to separate from the clutch portions of the first gear ring; when the transmission member is in the second state, the first portion of the transmission member is separated from the rotary member, and the elastic reset member drives the clutching member to be connected to the clutch portions of the first gear ring.

Preferably, the first gear ring has a plurality of grooves as the plurality of clutch portions for receiving the clutching member, the clutching member is a rod having two ends that is capable of being inserted into one of the grooves. Under such design, the design of the clutching member and the clutch portion is simple, and the first gear ring can be stopped or released by inserting the rod into the groove or pulling the rod out of the groove.

Preferably, the clutching member is movable along the axis of the first gear ring with a first end of the clutching member facing an annular side surface of first gear ring, at least two clutch portions are disposed at intervals on the annular side surface of the first gear ring, and the first end of the clutching member is capable of being inserted into each clutch portion, the elastic reset member is a reset spring sleeved on a second end of the clutching member. It facilitates control of the first gear ring to be stopped or released, and the control is reliable.

Preferably, the gear box further has a second gear ring coaxially arranged in parallel with the first gear ring, and the second gear ring has a clutch channel for allowing the first end of the movable clutching member to pass through.

The clutching member is always arranged in the clutch channel, and when the transmission member is in the second state, the first end of the clutching member runs through the clutch channel to be inserted into one of the clutch portions of the first gear ring. Under such design, the clutching member, on the one hand, can control the first gear ring to be stopped or released, and on the other hand, can further stop the second gear ring.

Preferably, the transmission member is a strip with two ends and a middle portion, the first portion and the second portion are respectively located at the two ends of the transmission member; one end of the transmission member has an opening defined as the second portion for clamping out of the second end of the clutching member, and the second portion of the transmission member is slidable along the second end of the clutching member. Under such design, the second portion of the transmission member has a simple design, and the clutching member can be effectively driven to act relative to the clutch portion.

Preferably, the clutching member has an annular limit ring protruding at the second end of the clutching member, the second portion of the transmission member and the elastic reset member are respectively located on a left side and a right side of the limit ring; the elastic reset member contacts with the right side of the limit ring, and the second portion of the transmission member resists against the left side of the limit ring when the transmission member is in the first state. By arranging the limit ring, the transmission member can more reliably drive the clutching member to be separated from the corresponding clutch portion, and further, the elastic reset member can better act on the clutching member.

Preferably, the middle portion of the transmission member is rotatable, and the two ends of the transmission member is capable of swinging relative to the rotatable middle portion of the transmission member.

When the transmission member is in the first state, the first portion of the transmission member resists against the rotary member; when the transmission member is in the second state, the first portion of the transmission member is separated from the rotary member, and the second portion resists against the limit ring. Under such design, the rotary member rotates to drive the transmission member to swing, so as to better drive the clutching member by means of the transmission member.

Preferably, the rotary member is a cam, and a periphery surface of the cam has a first position far away from a rotational center of the rotary member and a second position close to the rotational center of the rotary member; when the first position of the rotary member resists against the first portion of the transmission member, the transmission member is in the first state, and when the second position of the rotary member is away from the first portion of the transmission member, the transmission member is in the second state. Under such design, the rotary member has a simple design, and can better drive the transmission member to swing.

Preferably, the winch clutch further comprises a stroke switch group for controlling a stroke of the rotary member.

For achieving the second object, the winch comprises the winch clutch described above.

Compared with the prior art, the winch clutch of the present invention has the following advantages. The winch clutch comprises the drive motor, the rotary member, the transmission member, the clutching member and the elastic reset member. The clutching member is capable of separably being connected to the clutch portion on the first gear ring so as to stop the first gear ring, such that the gear box drives a winch drum to rotate; moreover, when the transmission member is in the first state, the first portion of the transmission member resists against the rotary member, the second portion of the transmission member drives the clutching member to be separated from the clutch portion on the first gear ring, the clutch is in neutral, and the winch drum does not rotate. When the transmission member is in the second state, the first portion of the transmission member is separated from the rotary member, and the elastic force of the elastic reset member drives the clutching member to be connected to the clutch portion on the first gear ring, so that the winch drum rotates.

Hence, the winch clutch of the present invention uses the drive motor to drive the rotary member to rotate, and achieves connection or separation between the clutching member and the clutch portion on the first gear ring by means of the transmission member, so as to control the winch to be started or stopped. Compared with the existing manual clutches, manual operation is not required, operation is convenient, completely solving the problem of a failure of a vehicle winch clutch.

DESCRIPTION OF THE EMBODIMENTS

The present invention will be further described below in detail by embodiments with reference to the accompanying drawings.

It should be noted that in the description of the present invention, the terms “center”, “longitudinally”, “horizontally”, “length”, “width”, “thickness”, “up, down”, “front, back”, “left, right”, “vertical”, “parallel”, “top, bottom”, “inside, outside”, “clockwise”, “counterclockwise”, “axial direction”, “radial direction”, “circumferential direction”, etc. to describe a direction or position based on the accompanying drawings are only used for describe the present invention and simplify the description, instead of indicating that devices or elements must have particular orientation or must be constructed and operated in a particular orientation. Since the embodiments disclosed by the present invention can be set in different directions, these terms indicating directions are only used as explanations and should not be used as restrictions. For example, the verbs “up”, “down” should not be limited to the direction opposite or consistent with the gravity. In addition, a feature defined as “first” or “second” may explicitly or implicitly comprises one or more such features.

Figure 1:
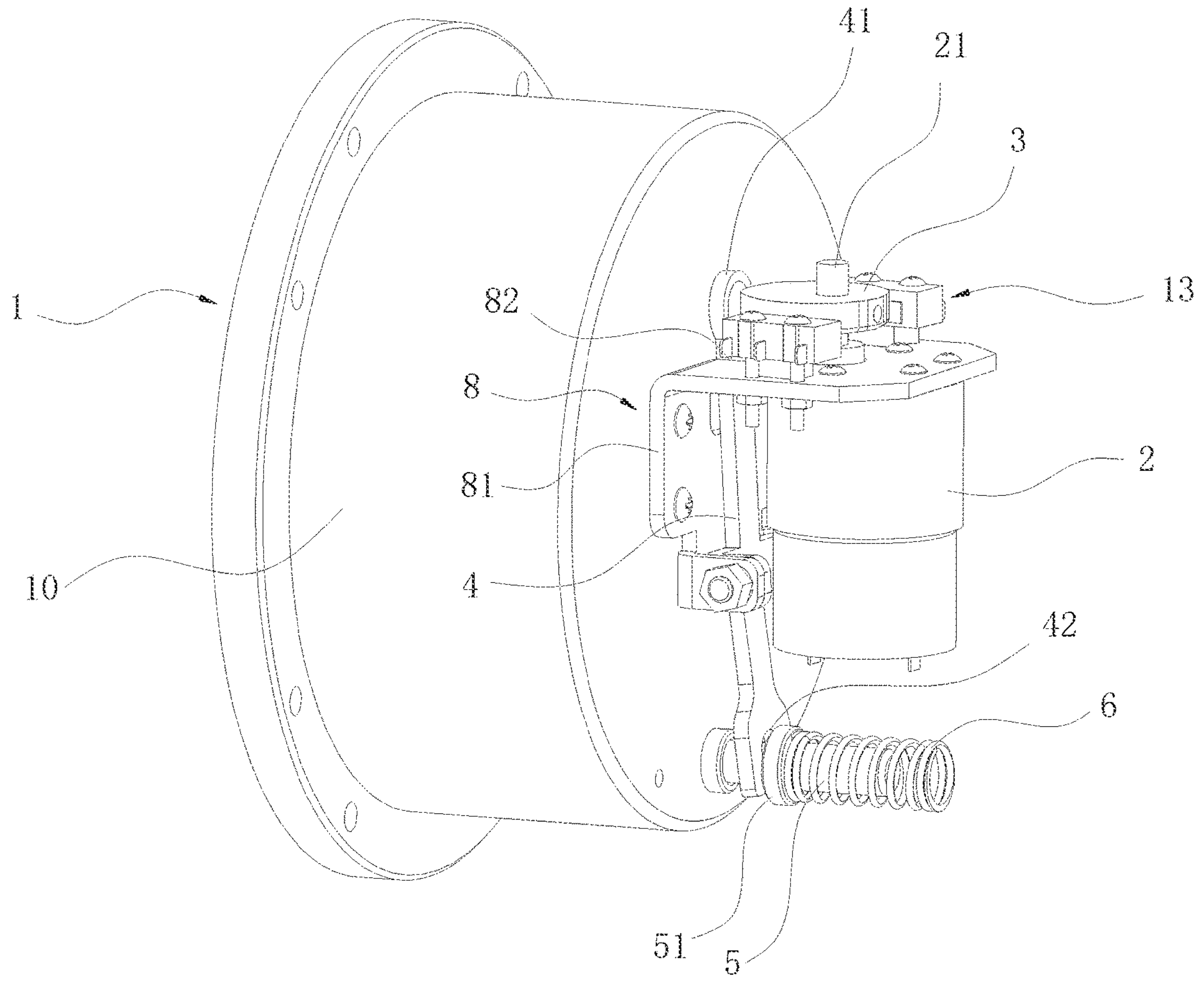
FIG. 1 is a perspective view of a winch clutch according to an embodiment of the present invention (when a transmission member is in the first state)
Figure 2:
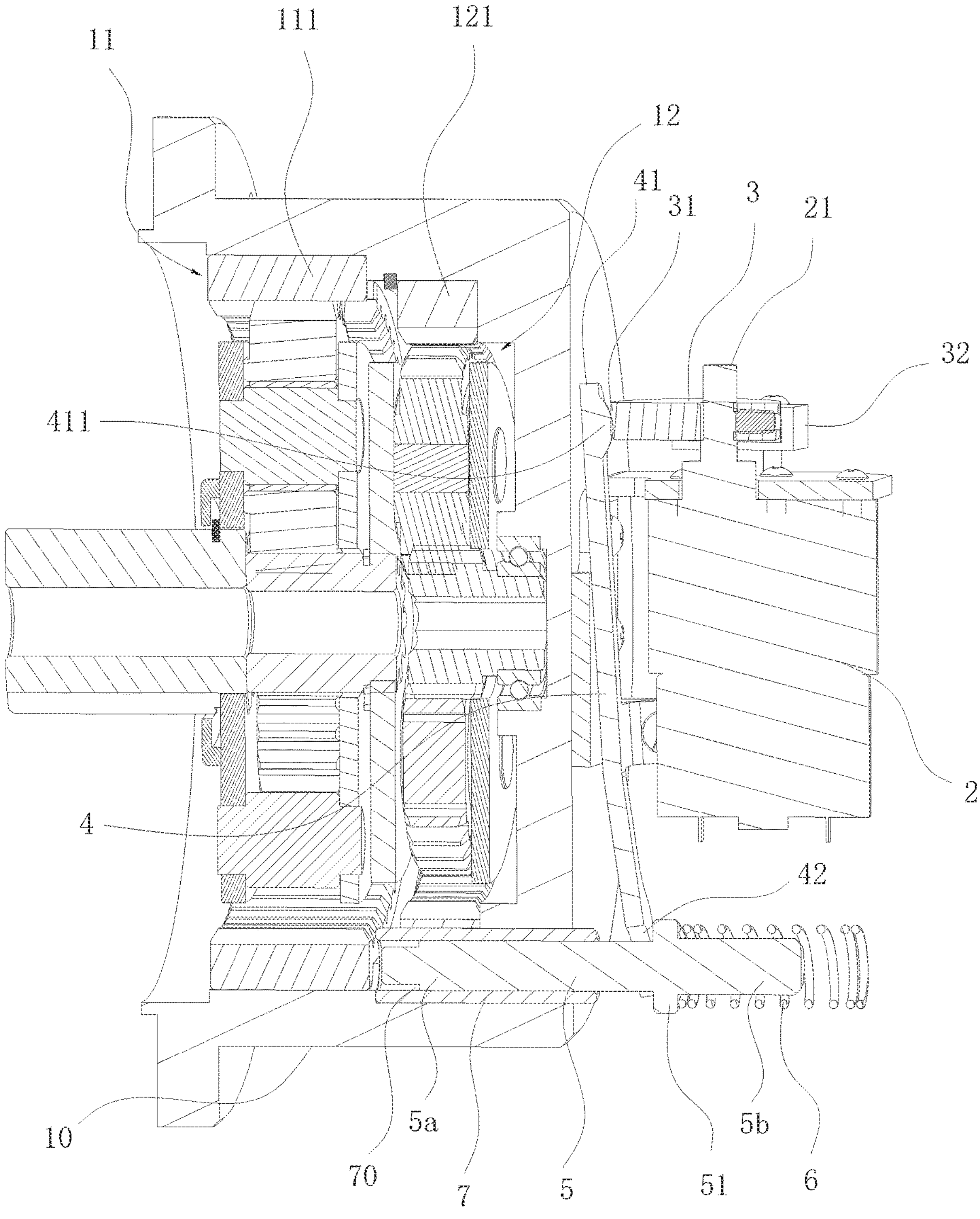
FIG. 2 is a sectional view of the winch clutch according to the embodiment of the present invention (when a transmission member is in the first state)
Figure 3:
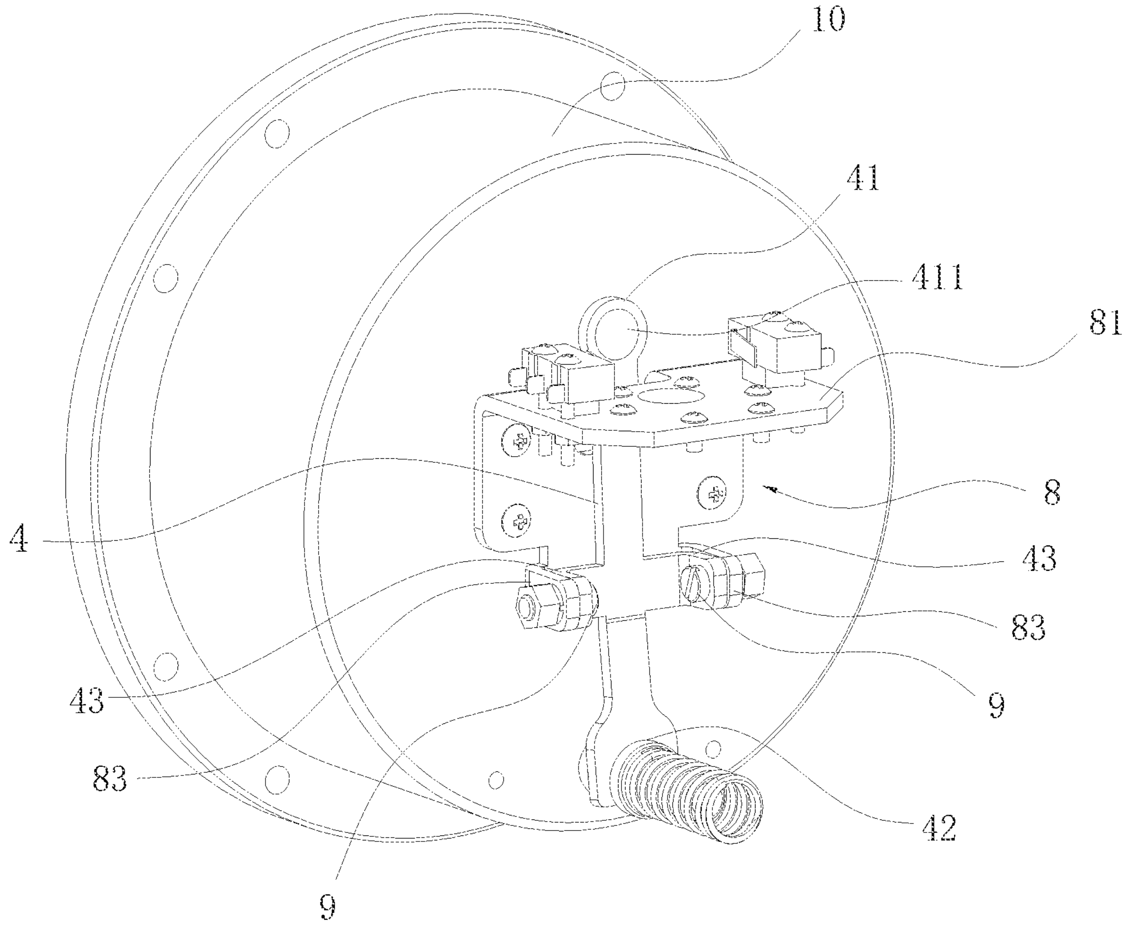
FIG. 3 is a perspective view of a partial winch clutch according to the embodiment of the present invention (when a transmission member is in the first state)
Figure 4:
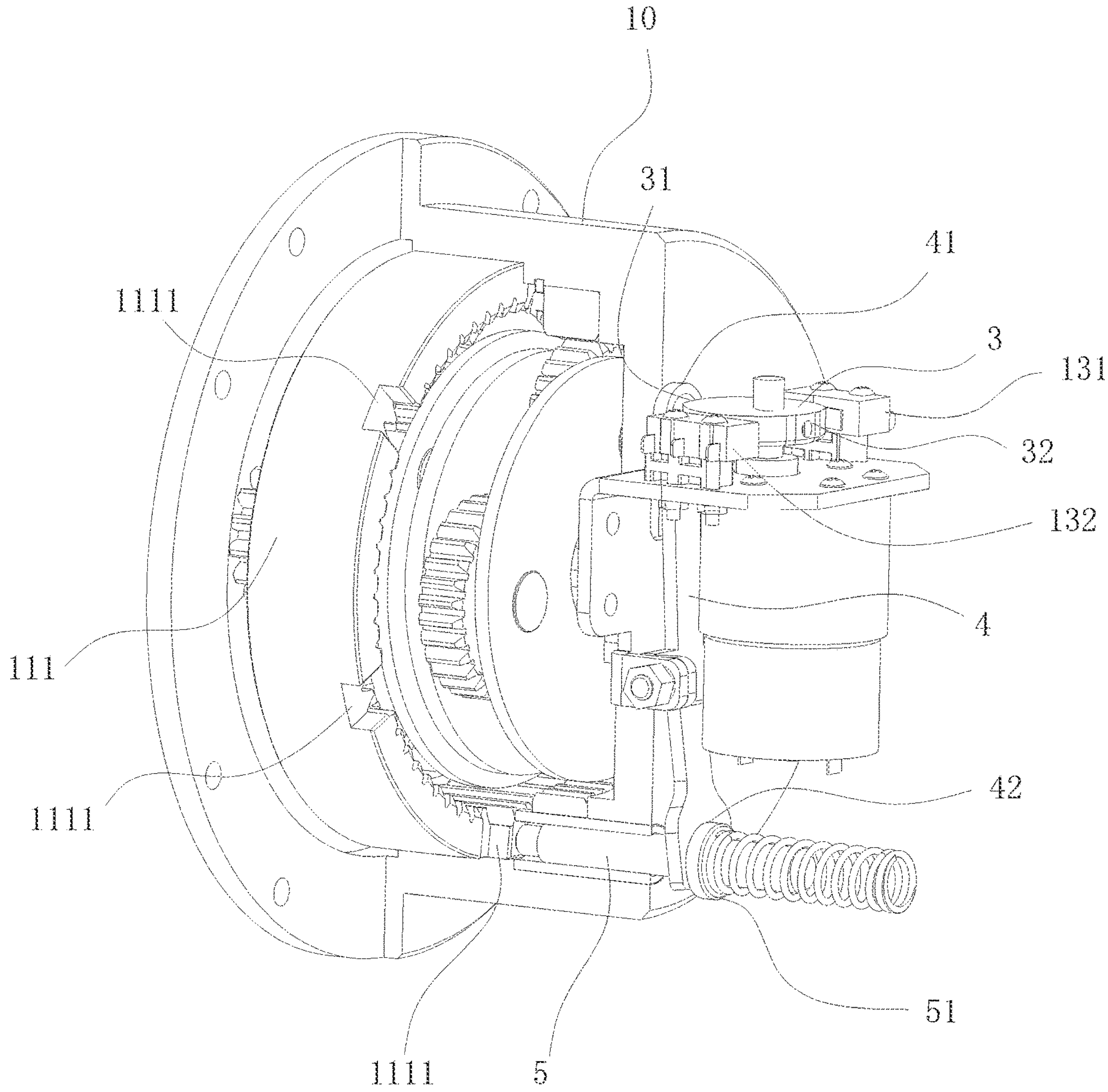
FIG. 4 is another perspective view of the partial winch clutch according to the embodiment of the present invention (when a transmission member is in the first state)
Figure 5:
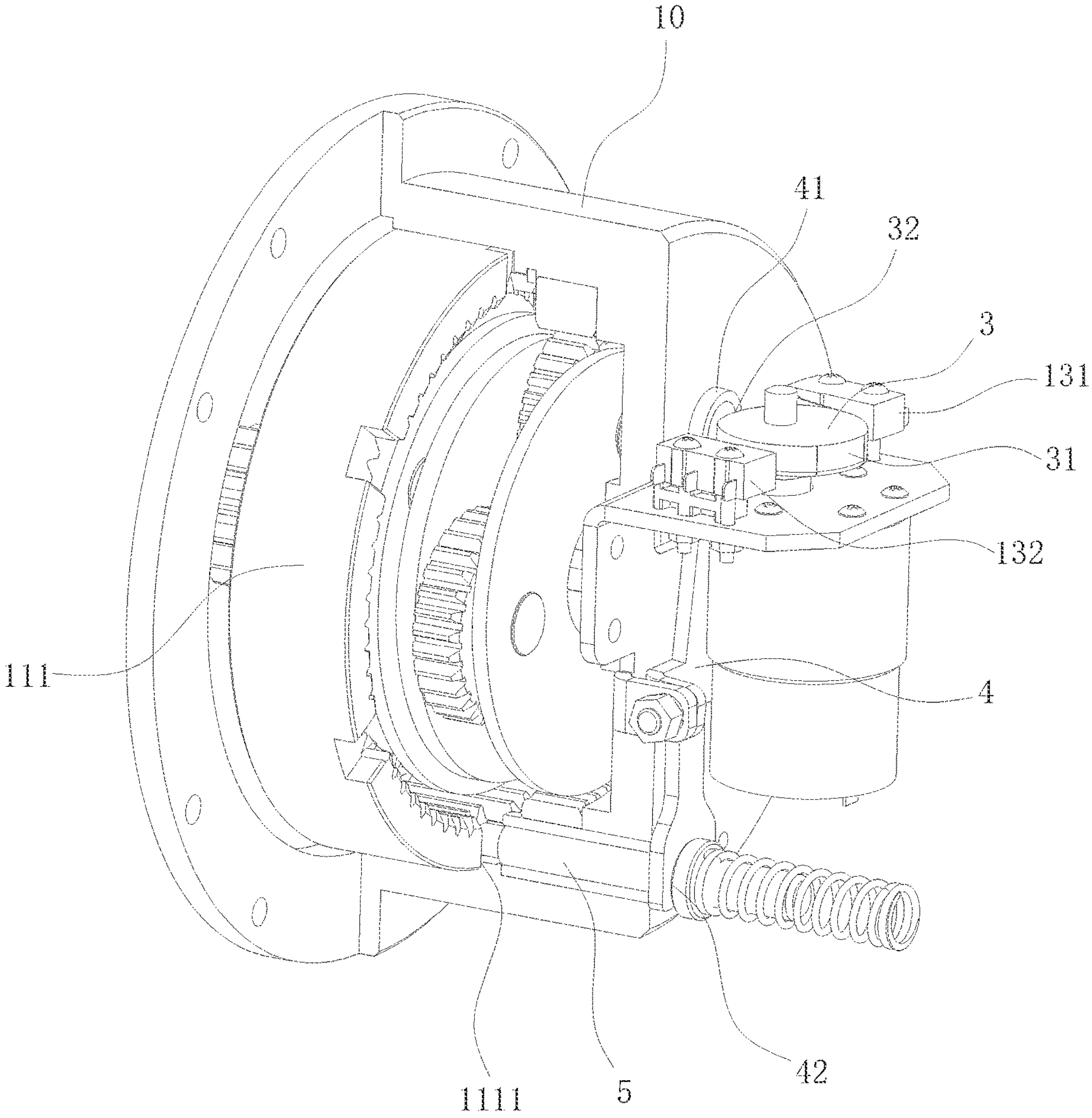
FIG. 5 is a perspective view of the partial winch clutch according to the embodiment of the present invention (when a transmission member is in the second state)
Figure 6:
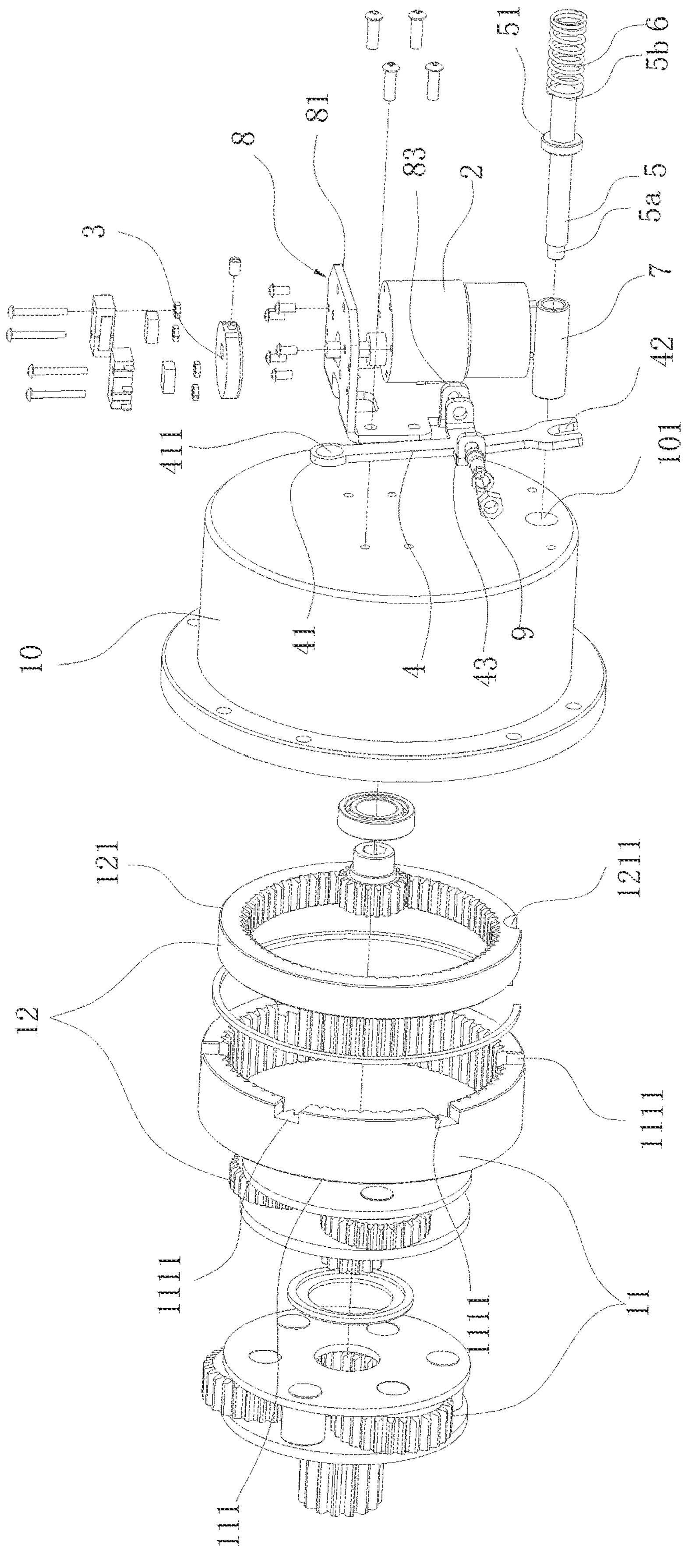
FIG. 6 is an exploded view of the winch clutch according to the embodiment of the present invention.

FIG. 1 to FIG. 6 show a preferred embodiment of the winch clutch of the present invention. The winch comprises a winch drum and a winch clutch for controlling an operation state of the winch drum. The winch clutch comprises a gear box 1, a drive motor 2, a rotary member 3, a transmission member 4, a clutching member 5 and an elastic reset member 6. The gear box 1 comprises a cylindrical box body 10 vertically arranged in a lengthwise direction, a part of a periphery surface of the box body 10 is closed, and a first planetary gear assembly 11 and a second planetary gear assembly 12 are arranged in the box body 10 in parallel and in an axial direction. The first planetary gear assembly 11 comprises a rotatable first gear ring 111, and the second planetary gear assembly 12 comprises a non-rotatable second gear ring 121.

The drive motor 2 is vertically mounted on a surface of the box body 10 and in parallel with the box body 10, and the rotary member 3 is mounted on an output shaft 21 of the drive motor 2. In this embodiment, the rotary member 3 is a cam, and a periphery surface of the cam has a first position 31 far away from a rotational center (that is, the output shaft 21 of the drive motor 2) of the rotary member 3 and a second position 32 close to the rotational center of the rotary member 3. In this embodiment, an included angle between the first position 31 and the second position 32 is 180°. The winch clutch also comprises a stroke switch group 13 for controlling a rotation stroke of the rotary member 3, and the stroke switch group 13 comprises a first stroke switch 131 and a second stroke switch 132 that are arranged on either side of the rotary member 3, respectively.

The transmission member 4 is movable and has a first portion 41 and a second portion 42 both located on one side of the rotary member 3 and capable of being separated from or resisting against the rotary member 3 during the rotation of the rotary member 3, the rotary member 3 is capable of driving the movable transmission member 4 to be at least two states as follows.

When the transmission member 4 is in a first state, the first portion 41 of the transmission member 4 resists against the first portion 31 of the rotary member 3; when the transmission member 4 is in the second state, the first portion 41 of the transmission member 4 is separated from the first portion 31 of the rotary member 3, and is opposite the second position 31 of the rotary member 3.

The first gear ring 111 has a plurality of clutch portions 1111, the clutching member 5 is movable and separably connected to the plurality of clutch portions 1111 of the first gear ring 111, so as to stop the first gear ring 111; the elastic reset member 6 is connected to the clutching member 5, when the clutching member 5 is separated from the clutch portions 1111 of the first gear ring 111, the elastic reset member 6 make the clutching member 5 keep to be connected to the clutch portions 1111; and, when the transmission member 4 is in the first state, the first portion 41 of the transmission member 4 resists against the rotary member 3, and the second portion 42 of the transmission member 4 drives the clutching member 5 to separate from the clutch portions 1111 of the first gear ring 111; when the transmission member 4 is in the second state, the first portion 41 of the transmission member 4 is separated from the rotary member 3, and the elastic reset member 6 drives the clutching member 5 to be connected to the clutch portions 1111 of the first gear ring 111.

It can be determined that the winch clutch of the present invention comprises the drive motor 2, the rotary member 3, the transmission member 4, the clutching member 5 and the elastic reset member 6. The clutching member 5 may be separably connected to the clutch portion 1111 on the first gear ring 111 to stop the first gear ring 111, such that the gear box 1 drives the winch drum to rotate, and the winch operates. When the transmission member 4, the first portion 41 of the transmission member 4 resists against the rotary member 3, and the second portion 42 of the transmission member 4 drives the clutching member 5 to separate from the clutch portions 1111 of the first gear ring 111, the clutch is in neutral, the winch drum does not rotate, and the winch fails to work. When the transmission member 4 is in a second state, the first portion 41 of the transmission member 4 is separated from the rotary member 3, and the elastic reset member 6 drives the clutching member 5 to be connected to the clutch portions 1111 of the first gear ring 111. The first gear ring 111 stops rotating, the winch drum is driven to rotate, and the winch operates. Hence, the winch clutch of the present invention uses the drive motor 2 to drive the rotary member 3 to rotate, and achieves connection or separation between the clutching member 5 and the clutch portion 1111 on the first gear ring 111 by means of the transmission member 4, so as to control the winch to be started or stopped. Compared with the existing manual clutches, manual operation is not required, operation is convenient, completely solving the problem of a failure of a vehicle winch clutch due to inconvenient operation.

In this embodiment, the first gear ring 111 has a plurality of grooves as the plurality of clutch portions 1111 for receiving the clutching member 5, the clutching member 5 is a rod having two ends that is capable of being inserted into one of the grooves. In this way, the design of the clutching member 5 and the clutch portion 1111 is simple, and the first gear ring 111 can be stopped or released by inserting the rod into the groove or pulling the rod out of the groove. Further, the clutching member 5 is movable along the axis of the first gear ring 111 with a first end of the clutching member 5 facing an annular side surface of first gear ring 111, at least two clutch portions 1111 are disposed at intervals on the annular side surface of the first gear ring 111, and the first end of the clutching member 5 is capable of being inserted into each clutch portion 1111, the elastic reset member 6 is a reset spring sleeved on a second end **5*b* of the clutching member 5. It facilitates control of the first gear ring 111** to be stopped or released, and the control is reliable. Specifically, in this embodiment, each groove is a radial through groove.

In addition, the second gear ring 121 has a clutch channel 70 for allowing the first end **5*a* of the movable clutching member 5 to pass through; when the transmission member 4 is in the second state, the first end 5*a* of the clutching member 5 runs through the clutch channel 70 to be inserted into one of the clutch portions 1111 of the first gear ring 111. In this way, the clutching member 5, on the one hand, can control the first gear ring 111 to be stopped or released, and on the other hand, can further stop the second gear ring 121 so as to implement two functions simultaneously. Specifically, in this embodiment, an outer side surface of the second gear ring 121 is sunk inwards to form an axially through mounting groove 1211, a clutch sleeve 7 is embedded in the mounting groove 1211, and an inner chamber of the clutch sleeve 7 constitutes the clutch channel 70. The clutching member 5 is arranged outside the box body 10 and below the drive motor 2, and the box body 10 has a through hole 101 on the surface, the first end 5*a* of the clutching member 5 is inserted into the clutch channel 70 through the through hole 101**.

In this embodiment, the transmission member 4 is an elongated strip extending upwards and downwards and arranged in a lengthwise direction. One end of the transmission member 4 has an opening defined as the second portion 42 for clamping out of the second end **5*b* of the clutching member 5, and the second portion 42 of the transmission member 4 is slidable along the second end 5*b* of the clutching member 5. Under such design, the second portion 42 of the transmission member 4 has a simple design, and the clutching member 5 can be effectively driven to act relative to the clutch portion 1111**.

Further, the clutching member 5 has an annular limit ring 51 protruding at the second end **5*b* of the clutching member 5, the second portion 42 of the transmission member 4 and the elastic reset member 6 are respectively located on a left side and a right side of the limit ring 51; the elastic reset member 6 contacts with the right side of the limit ring 51, and the second portion 42 of the transmission member 4 resists against the left side of the limit ring 51 when the transmission member 4 is in the first state. By arranging the limit ring 51, the transmission member 4 can more reliably drive the clutching member 5 to be separated from the corresponding clutch portion 1111, and also, the elastic reset member 6 can better act on the clutching member 5. In addition, the first portion 41 of the transmission member 4 is an upper end of the transmission member 4, the first portion 41 faces the rotary member 3, an arc-shaped bump 411 that resists against the first position 31 is arranged on the surface of the first portion 41, facing the rotary member 3**, such that sensitivity of the winch clutch can be improved, and an operation state of the winch can be better controlled.

Further, in this embodiment, the middle portion of the transmission member 4 is rotatable, and the two ends of the transmission member 4 is capable of swinging relative to the rotatable middle portion of the transmission member 4; when the transmission member 4 is in the first state, the first portion 41 of the transmission member 4 resists against the rotary member 3; when the transmission member 4 is in the second state, the first portion 41 of the transmission member 4 is separated from the rotary member 3, and the second portion 42 resists against the limit ring 51. Under such design, the rotary member 3 rotates to drive the transmission member 4 to swing, so as to better drive the clutching member 5 by means of the transmission member 4.

Specifically, a mounting frame 8 is mounted on the surface of the box body 10, and the mounting frame 8 comprises a bent mounting plate 81. A vertical portion of the mounting plate 81 is fixed to the surface of the box body 10, and a horizontal portion is located on the vertical portion. The drive motor 2 is mounted on the horizontal portion of the mounting plate 81, and the rotary member 3 is arranged on the horizontal portion. The mounting frame 8 has an opening 82 at a junction of the vertical portion and the horizontal portion of the mounting plate 81 for the upper end of the rotary member 3 to pass through, and movement of the upper end of the transmission member 4 can be limited to a certain extent through the opening 82. The transmission member 4 is arranged facing the surface of the box body 10, the middle portion of the transmission member 4 extends outwards along two sides in a width wise direction and bents to form connection plates 43, two sides of a lower end of the vertical portion of the mounting plate 81 are bent to form hinge seats 83 each corresponding to one connection plate 43, and the connection plates 43 are rotatably connected to the corresponding hinge seats 83 through transverse rotary shafts 9. Through the design described above, the drive motor 2 is mounted, and the transmission member 4 is rotatably arranged.

What is claimed is:

1. A winch clutch, comprising:

a gear box having a first gear ring that is rotatable, a drive motor having an output shaft, a rotary member, a transmission member, a clutching member having a first end and a second end, and an elastic reset member; wherein, the rotary member is connected to the output shaft of the drive motor rotating with the output shaft;

the transmission member is movable and has a first portion and a second portion both located on one side of the rotary member and capable of being separated from or resisting against the rotary member during a rotation of the rotary member, the rotary member is capable of driving the transmission member to be at least in a first state and a second state;

the first gear ring has a plurality of clutch portions, the clutching member is movable and separably connected to the plurality of clutch portions of the first gear ring, so as to stop the first gear ring;

the elastic reset member is connected to the clutching member, when the clutching member is separated from the clutch portions of the first gear ring, the elastic reset member enables the clutching member to be connected to the clutch portions;

when the transmission member is in the first state, the first portion of the transmission member resists against the rotary member, and the second portion of the transmission member drives the clutching member to separate from the clutch portions of the first gear ring;

and when the transmission member is in the second state, the first portion of the transmission member is separated from the rotary member, and the elastic reset member drives the clutching member to be connected to the clutch portions of the first gear ring.

2. The winch clutch of claim 1, wherein the plurality of clutch portions are a plurality of grooves on the first gear ring for receiving the clutching member, the clutching member is a rod having two ends and is capable of being inserted into one of the plurality of the grooves.

3. The winch clutch of claim 2, wherein the clutching member is movably disposed on a side of first gear ring along an axis of the first gear ring, the clutch portions comprises at least two clutch portions disposed at intervals on an annular side surface of the first gear ring, and a first end of the clutching member is capable of being inserted into each of the clutch portions, the elastic reset member is a reset spring sleeved on a second end of the clutching member.

4. The winch clutch of claim 3, wherein the gear box further comprises a second gear ring coaxially arranged in parallel with the first gear ring, and the second gear ring is provided with a clutch channel for allowing the first end of the clutching member to pass through;

when the transmission member is in the second state, the first end of the clutching member moves out of the clutch channel to be inserted into one of the clutch portions of the first gear ring.

5. The winch clutch of claim 2, wherein the transmission member is a strip, the first portion and the second portion are respectively located at two ends of the transmission member;

the second portion is an opening on one of the two ends of the transmission member, the opening matches the second end of the clutching member, is clamped on the second end of the clutching member, and is slidable along the second end of the clutching member.

6. The winch clutch of claim 5, wherein the clutching member is provided with a limit ring circumferentially protruding at the second end of the clutching member, the second portion of the transmission member and the elastic reset member are respectively located on a left side of the limit ring and a right side of the limit ring;

the elastic reset member contacts the right side of the limit ring, and the second portion of the transmission member resists against the left side of the limit ring when the transmission member is in the first state.

7. The winch clutch of claim 6, wherein a middle portion of the transmission member is rotatable, and the two ends of the transmission member is capable of swinging relative to the rotatable middle portion of the transmission member;

when the transmission member is in the first state, the first portion of the transmission member resists against the rotary member; when the transmission member is in the second state, the first portion of the transmission member is separated from the rotary member, and the second portion resists against the limit ring.

8. The winch clutch of claim 1, wherein the rotary member is a cam, and a periphery surface of the cam has a first position far away from a rotational center of the rotary member and a second position close to the rotational center of the rotary member;

when the first position of the rotary member resists against the first portion of the transmission member, the transmission member is in the first state, and when the second position of the rotary member is away from the first portion of the transmission member, the transmission member is in the second state.

9. The winch clutch of claim 8, wherein further comprises a stroke switch group for controlling a stroke of the rotary member.

10. A winch, having the winch clutch of claim 1.

* * * * *